United States Patent
Dickinson

(10) Patent No.: US 7,637,023 B2
(45) Date of Patent: Dec. 29, 2009

(54) THREADED STUD POSITION MEASUREMENT ADAPTER

(75) Inventor: Brian R. Dickinson, Grass Lake, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 184 days.

(21) Appl. No.: 11/956,936

(22) Filed: Dec. 14, 2007

(65) Prior Publication Data

US 2009/0151178 A1 Jun. 18, 2009

(51) Int. Cl.
*G01C 15/02* (2006.01)
*G01B 11/00* (2006.01)

(52) U.S. Cl. .......................... 33/293; 33/286; 356/620; 359/515

(58) Field of Classification Search ............... 33/203.18, 33/1 G, 1 CC, 263, 286, 293; 356/620; 359/515
See application file for complete search history.

(56) References Cited

U.S. PATENT DOCUMENTS

| | | | | |
|---|---|---|---|---|
| 760,774 | A | | 5/1904 | Blakeslee |
| 2,414,733 | A | * | 1/1947 | Fuchs ........................... 33/286 |
| 3,778,169 | A | * | 12/1973 | Adams ........................ 356/399 |
| 3,898,743 | A | * | 8/1975 | Myeress ........................ 33/293 |
| 4,926,563 | A | * | 5/1990 | Smith ........................... 33/293 |
| 5,073,005 | A | * | 12/1991 | Hubbs ........................ 359/515 |
| 5,179,788 | A | * | 1/1993 | Jadach ........................ 33/644 |
| 5,776,688 | A | | 7/1998 | Bittner et al. |
| 6,134,792 | A | * | 10/2000 | January ..................... 33/203.18 |
| 6,230,382 | B1 | | 5/2001 | Cunningham et al. |
| 6,675,122 | B1 | | 1/2004 | Markendorf et al. |
| 6,813,840 | B1 | | 11/2004 | Delmas et al. |
| 6,901,673 | B1 | * | 6/2005 | Cobb et al. .................... 33/502 |
| 7,216,436 | B2 | * | 5/2007 | Whitworth et al. ............ 33/286 |
| 7,500,318 | B2 | * | 3/2009 | Dickinson ..................... 33/293 |
| 7,557,936 | B2 | * | 7/2009 | Dickinson ................... 356/620 |
| 2004/0162699 | A1 | | 8/2004 | Buss |
| 2004/0228517 | A1 | | 11/2004 | Massen |
| 2008/0123110 | A1 | * | 5/2008 | Dickinson et al. ........... 356/620 |
| 2008/0192371 | A1 | * | 8/2008 | Hubbs ........................ 359/883 |

FOREIGN PATENT DOCUMENTS

| | | |
|---|---|---|
| JP | 2005274356 | 10/2005 |
| WO | WO-94/27198 | 11/1994 |
| WO | WO-2004/035464 | 4/2004 |

* cited by examiner

*Primary Examiner*—Christopher W Fulton
(74) *Attorney, Agent, or Firm*—Gifford, Krass, Sprinkle, Anderson & Citkowski, P.C.

(57) ABSTRACT

The present invention discloses a position measurement adapter for attachment to a threaded stud, the adapter having an elongate rigid member with a first end and a second end. The elongate rigid member has a threaded aperture that extends along an axial direction from the first end to a distance that is spaced apart from the second end. In addition, the elongate rigid member has a hollow shaft that extends in the axial direction from the threaded aperture towards the second end. The hollow shaft is radially larger than the threaded aperture. A contrast target can be located on the second end. In some instances, the hollow shaft extends to the second end and the elongate member has a cylindrical shape.

15 Claims, 1 Drawing Sheet

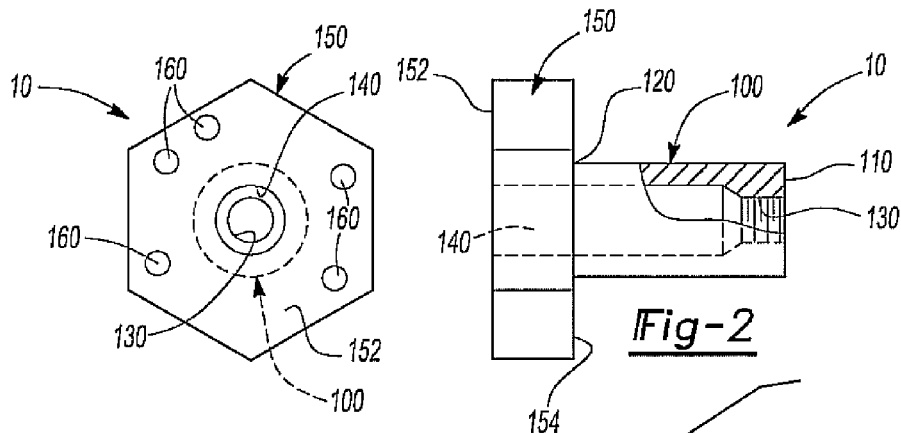
Fig-1
Fig-2
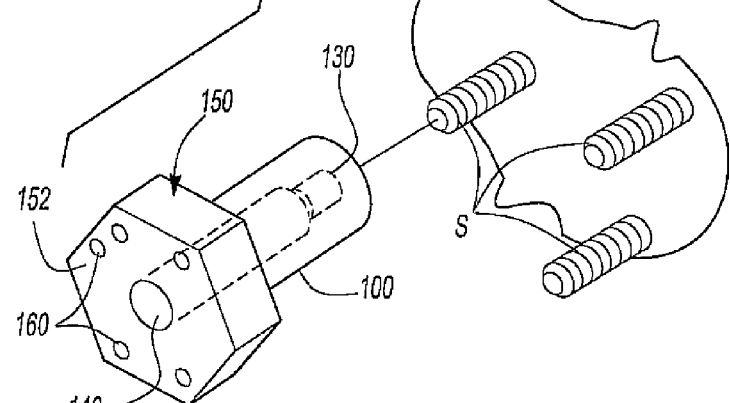
Fig-3
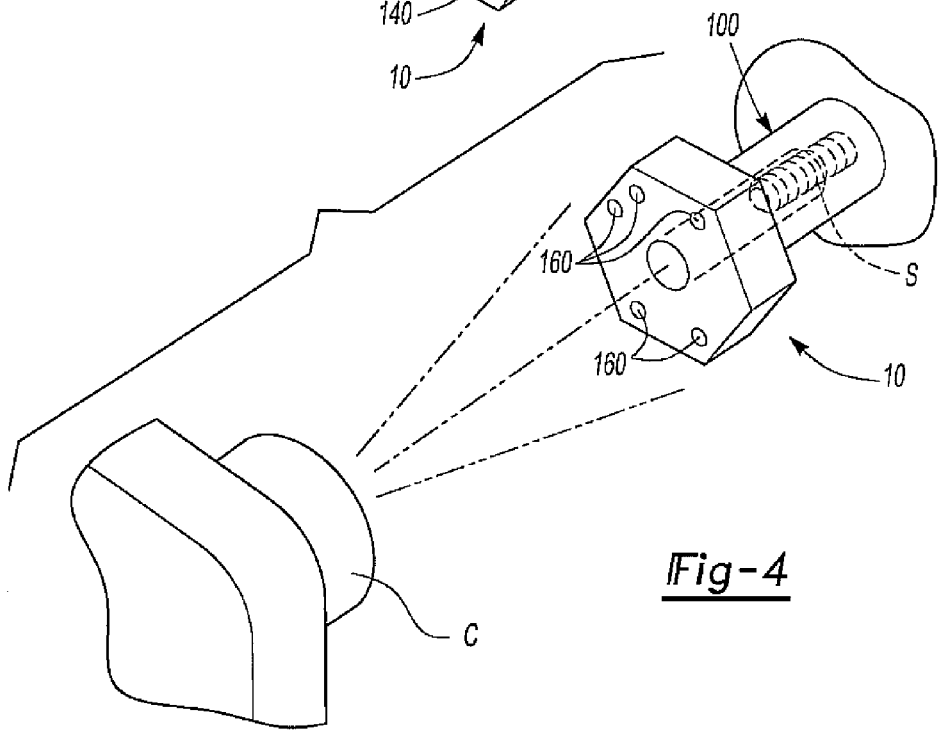
Fig-4

THREADED STUD POSITION MEASUREMENT ADAPTER

FIELD OF THE INVENTION

The present invention relates in general to a position measurement adapter and in particular to a position measurement adapter for measuring the location of a threaded stud.

BACKGROUND OF THE INVENTION

An important activity in industrial manufacturing processes is the taking of precise measurements of patterns, machine components, workpieces, locations of holes and/or studs and the like. In particular, when individual components are manufactured at different locations and assembled together at a final assembly shop, proper alignment of said components is critical. Accuracy in fitting these components together makes it possible to avoid reworking and modifications. Furthermore, when individual components do not properly align, identification of the root cause of the misalignment is important for the analysis and correction of the problem.

Providing holes, studs and abutment surfaces in proper, precise locations on tooling, machine components, automobile frames, and the like is normally accomplished using a reference system such as a tool and ball system or a line of sight system. In each of these reference systems, a sighting target is positioned on special tooling and instruments are used to determine proper, precise locations of holes, studs and/or abutment surfaces with respect to such targets.

Using conventional coordinate measuring machines a hole position, threaded or otherwise, is typically described by selecting three points on the surface adjacent to the hole which is used to create a plane, and the hole axis vector. Three points are then selected in the hole to create the hole axis. The intersection of the hole axis along the vector at the plane then describes the center point of the hole on the surface. This method is subject to operator error and obstruction issues. At times a gauge is inserted into the hole and this provides an easier means of picking or selecting points on a cylinder parallel to the hole axis and thus a location of a stud to be located within said hole.

With surface scanning equipment, the inner surface of a hole or the outer surface of a stud can be scanned. From the scanned data, a surface and cylinder can be constructed and the intersection of the surface and the constructed cylinder axis can be used to determine a measurement point. This method is tedious but can yield accurate positional measurements. Furthermore, this method cannot be used on any fastener without a direct line of sight.

Using photogrammetry a similar procedure is undertaken where three points are selected on the surface near the hole, or a stud in the hole, in question to produce a plane and the hole or stud edge is determined via contrast in measurement images. This method becomes less accurate as the contrast between the edge and the background data is reduced. Accuracy is also reduced as the angle of incidence for the measurement image increases, becoming essentially useless as the angle approaches 40 degrees. Furthermore, this method cannot determine the position of holes or studs which are obstructed by other features of the object being measured. In many cases a target can be inserted into the hole or on the stud thus allowing a direct measurement, however accuracy is again degraded as the angle of incidence increases and is useless if the hole or stud is obstructed. Advanced computer-aided systems are typically utilized in the above referred to reference systems.

In the advancement of the above described measurement systems, advanced computer-aided photogrammetry has been utilized as a measurement tool for determining specific locations on industrial devices and equipment. Light reflective or contrasting targets are positioned at predetermined locations on specialized tooling in accordance with a prearranged pattern, thus allowing the precise relationship of the preselected locations to be measured and/or verified. However, when the locations of threaded studs are desired and the threaded studs each have different lengths, the manufacture of different tooling for each length or range of length can be a burdensome and cost prohibitive. For example, if a specialized tool has been manufactured to fit onto a stud having a length up to 3 centimeters, the desire to measure the location of a stud that is 5 centimeters long requires that the current tool be modified or that a new tool be fabricated. Therefore, there is a need for specialized tooling that will allow a user to secure a contrast or reflective target relative to a threaded stud, the tooling operable to accept threaded studs having different lengths.

SUMMARY OF THE INVENTION

The present invention discloses a position measurement adapter for attachment to a threaded stud, the adapter having an elongate rigid member with a first end and a second end. The elongate rigid member has a threaded aperture that extends along an axial direction from the first end to a distance that is spaced apart from the second end. In addition, the elongate rigid member has a hollow shaft that extends in the axial direction from the threaded aperture towards the second end. The hollow shaft is radially larger than the threaded aperture. A contrast target can be located on the second end. In some instances, the hollow shaft extends to the second end and the elongate member has a cylindrical shape.

BRIEF DESCRIPTION OF THE DRAWINGS

FIG. 1 is an end view of an embodiment of the present invention;

FIG. 2 is a side view of an embodiment of the present invention;

FIG. 3 is a perspective view of an embodiment of the present invention; and

FIG. 4 is a perspective view of an embodiment of the present invention illustrating its use.

DETAILED DESCRIPTION OF THE INVENTION

The present invention discloses a position measurement adapter that affords for the measuring of the position of a threaded stud. The adapter can include an elongate rigid member having a first end and a second end with a threaded aperture extending in an axial direction from the first end to a distance spaced apart from the second end. A hollow shaft extends from the threaded aperture towards the second end, and in some instances extends all the way to and through the second end. The hollow shaft is radially larger than the threaded aperture and thereby affords for a threaded stud to extend beyond said threaded aperture. It is appreciated that for the purposes of the present invention the term "shaft" means a passage or passageway.

A contrast target member can optionally be included, the member having a top surface and a bottom surface, the bottom surface being attached to the second end of the elongate rigid member. In some instances, the contrast target member can have a hexagonal or other polygon shape that affords for easy grasping of the adapter. In addition, the elongate member can be in the form of a cylinder, the cylinder with the threaded aperture therein affording for the threading of the position measurement adapter onto a threaded stud. The second end of the elongate rigid member or the top surface of the contrast target member that is attached to the second end of the elongate rigid member can have a contrast target attached thereto, thereby affording for the use of photogrammetry techniques to determine the location of the threaded stud relative to a surface.

Turning now to FIGS. 1-4, an embodiment of the position measurement adapter is shown generally at reference numeral 10. The adapter 10 can include an elongate rigid member 100, the rigid member 100 having a first end 110 and a second end 120. The first end 110 has a threaded aperture 130 that extends in an axial direction from the first end 110 to a distance spaced apart from the second end 120. Extending from the threaded aperture 130 in the same axial direction towards the second end 120 is a hollow shaft 140. The threaded aperture 130 and hollow shaft 140 can be located on a central axis of the elongate member 100. In some instances, the hollow shaft 140 extends to and thorough the second end 120, however this is not required.

Optionally attached to the second end 120 can be a contrast target member 150. The contrast target member 150 has a top surface 152 and a bottom surface 154. The bottom surface 154 can be fixedly attached to the second end 120. In some instances, the contrast target member 150 is integral with the elongate rigid member 100. In the alternative, the contrast target member 150 can be attached to the second end 120 of the elongate rigid member 100 using any method known to those skilled in the art, illustratively including welding, adhesives, threaded joints and the like. As illustrated in FIG. 2, the hollow shaft 140 can extend to the top surface 152 of the contrast target member 150, however this is not required.

Looking specifically at FIG. 3, a perspective view of the position measurement adapter 10 is shown in relation to three threaded studs S. It is appreciated that the threaded aperture 130 is dimensioned such that the position measurement adapter 10 can be threaded onto one of the threaded studs S. It is appreciated that contrast targets 160 can be attached to the top surface 152 of the contrast target member 150. In the alternative, if the position measurement adapter does not include a contrast target member 150, the contrast targets 160 can be attached to the second end 120 of the elongate rigid member 100.

After the position measurement adapter 10 has been threaded onto one of the threaded studs S as illustrated in FIG. 4, a camera C can be used with computer-aided photogrammetry to determine the exact location of the contrast targets 160 and thus the location of the threaded stud S. In this manner, a single position measurement adapter 10 can be threaded onto threaded studs having different lengths and used to determine their location. The top surface 152 can have at least three individual contrast targets 160. Contrast or reflective targets 160 are commercially available and commonly purchased by those of skill in the art. One suitable embodiment of a contrast target includes a circular target with a white center "reflector" surrounded by a black background.

It is appreciated that the position measurement adapter disclosed herein can be made from any material known to those skilled in the art, illustratively including metals, alloys, ceramics, plastics and combinations thereof. It is also appreciated that the foregoing description is illustrative of particular embodiments of the invention, but these embodiments are not meant to be a limitation upon the practice thereof. The following claims, including all equivalents thereof, are intended to define the scope of the invention.

I claim:

1. A position measurement adapter for attachment to a threaded stud comprising:
    an elongate rigid member having a first end and a second end;
    a threaded aperture extending into said elongate rigid member in an axial direction from said first end to a distance spaced apart from said second end;
    a hollow shaft extending in an axial direction from said threaded aperture towards said second end;
    said hollow shaft radially larger than said threaded aperture; and
    a contrast target on said second end.

2. The position measurement adapter of claim 1, wherein said hollow shaft extends to said second end.

3. The position measurement adapter of claim 2, wherein said hollow shaft has a cylindrical shape.

4. The position measurement adapter of claim 1, wherein said elongate member has a cylindrical shape.

5. A position measurement adapter for attachment to a threaded stud comprising:
    an elongate rigid member having a first end and a second end;
    a contrast target member having a top surface and a bottom surface, said bottom surface attached to said second end;
    a threaded aperture extending into said elongate rigid member in an axial direction from said first end to a distance spaced apart from said top surface of said contrast target;
    a hollow shaft extending in an axial direction from said threaded aperture towards said top surface of said contrast target member;
    said hollow shaft radially larger than said threaded aperture; and
    a contrast target on said top surface of contrast target member.

6. The position measurement adapter of claim 5, wherein said hollow shaft extends to said top surface of said contrast target member.

7. The position measurement adapter of claim 5, wherein said elongate member has a cylindrical shape.

8. The position measurement adapter of claim 7, wherein said hollow shaft has a cylindrical shape.

9. The position measurement adapter of claim 5, wherein said contrast target member has a radial outer surface that extends beyond an outer surface of said elongate rigid member.

10. The position measurement adapter of claim 9, wherein said contrast target member has a cylindrical shape.

11. The position measurement adapter of claim 9, wherein said contrast target member has a polygon shape.

12. The position measurement adapter of claim 11, wherein said polygon shape is a rectangle.

13. The position measurement adapter of claim 11, wherein said polygon shape is a hexagon.

14. The position measurement adapter of claim 5, wherein said contrast target member is integral to said elongate rigid member.

15. The position measurement adapter of claim 5, wherein said top surface of said contrast target member has a plurality of contrast targets thereon.

* * * * *

UNITED STATES PATENT AND TRADEMARK OFFICE
CERTIFICATE OF CORRECTION

PATENT NO. : 7,637,023 B2  Page 1 of 1
APPLICATION NO. : 11/956936
DATED : December 29, 2009
INVENTOR(S) : Brian R. Dickinson It is certified that error appears in the above-identified patent and that said Letters Patent is hereby corrected as shown below:

Column 3, line 22 replace "thorough" with --through--

Signed and Sealed this

Twentieth Day of April, 2010

David J. Kappos
*Director of the United States Patent and Trademark Office*